(12) United States Patent
Berdelle-Hilge

(10) Patent No.: US 9,731,327 B2
(45) Date of Patent: Aug. 15, 2017

(54) DEVICE FOR SORTING OBJECTS

(71) Applicant: SIEMENS AKTIENGESELLSCHAFT, Munich (DE)

(72) Inventor: Peter Berdelle-Hilge, Constance (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/778,247

(22) PCT Filed: Mar. 6, 2014

(86) PCT No.: PCT/EP2014/054338
§ 371 (c)(1),
(2) Date: Sep. 18, 2015

(87) PCT Pub. No.: WO2014/146904
PCT Pub. Date: Sep. 25, 2014

(65) Prior Publication Data
US 2016/0279673 A1 Sep. 29, 2016

(30) Foreign Application Priority Data
Mar. 21, 2013 (DE) .................. 10 2013 204 997

(51) Int. Cl.
*B07C 3/08* (2006.01)
*B65G 47/46* (2006.01)
(Continued)

(52) U.S. Cl.
CPC ............... *B07C 3/082* (2013.01); *B07C 3/02* (2013.01); *B65G 47/38* (2013.01); *B65G 47/46* (2013.01); *B65G 2201/0285* (2013.01)

(58) Field of Classification Search
CPC ........ B07C 3/082; B65G 47/38; B65G 47/36; B65G 47/503; B65G 47/647; B65G 2201/0285; B65G 2207/14
See application file for complete search history.

(56) References Cited

U.S. PATENT DOCUMENTS 5,190,162 A * 3/1993 Hartlepp ................ B65G 47/78
209/360
7,397,011 B2 * 7/2008 Berdelle-Hilge ....... B07C 3/082
209/584
(Continued)

FOREIGN PATENT DOCUMENTS

EP 1894637 A1 3/2008
EP 1863600 B1 9/2009
(Continued)

*Primary Examiner* — Gene Crawford
*Assistant Examiner* — Keith R Campell
(74) *Attorney, Agent, or Firm* — Laurence Greenberg; Werner Stemer; Ralph Locher

(57) ABSTRACT

A device for sorting objects includes an input conveyor device with a plurality of input storage devices, which are movable in an input conveying direction. A loading station loads each input storage device with one object. An output conveyor device has a plurality of output storage devices, which are movable in an output conveying direction. A sorting end point discharges the objects. A first transfer region, in which the input conveyor device and the output conveyor device are arranged, allows objects to be transferred from the input storage devices into the output storage devices. A second transfer region, separate from the first transfer region, in which the output conveyor device and the sorting end point are arranged transfers objects from the output storage devices to the sorting end point. An additional sorting end point in the second transfer region enables more flexibly operation of the sorting device.

6 Claims, 4 Drawing Sheets

(51) Int. Cl.
*B65G 47/38* (2006.01)
*B07C 3/02* (2006.01)

(56) References Cited

U.S. PATENT DOCUMENTS

| | | | |
|---|---|---|---|
| 7,888,616 B2 * | 2/2011 | Berdelle-Hilge | ......... B07C 3/00 209/509 |
| 8,011,516 B2 | 9/2011 | Berdelle-Hilge | |
| 8,035,053 B2 | 10/2011 | Skrdlant et al. | |

FOREIGN PATENT DOCUMENTS

| | | |
|---|---|---|
| EP | 2095887 A1 | 9/2009 |
| WO | 2006100589 A1 | 9/2006 |
| WO | 2006100594 A1 | 9/2006 |

* cited by examiner

DEVICE FOR SORTING OBJECTS

BACKGROUND OF THE INVENTION

Field of the Invention

The invention relates to a device for the sorting of objects, with an input conveyor device, having a multiplicity of input storage means which are movable within an input conveying direction, with a loading station, which is embodied for the loading of the input storage means with in each case one object, with an output conveyor device, having a multiplicity of output storage means which are movable within a output conveying direction, with a sorting end point for removal of the objects, with a first transfer region, in which the input conveyor device and the output conveyor device are arranged in such a way that objects can be transferred from the input storage means into the output storage means, with a second transfer region separate from the first transfer region, in which the output conveyor device and the sorting end point are arranged in such a way that objects can be transferred from the output storage means to the sorting end point.

A device for the sorting of objects of the type cited above is for example described in EP 1 863 600 B1. A further sorting device is described in EP 2 095 887 A1. All these sorting systems work according to what is known as the collator principle. Collator mode means that during a run through the assigned first transfer region each output storage means passes all input storage means of the input conveyor device. In order to increase the throughput of the sorting device, the output storage means can in each case be embodied for the storage of a multiplicity of objects. In the case of flat postal consignments, such as for example standard letters and large-format letters, the output storage means can be embodied for the stacking of a multiplicity of letters.

In the case of the device cited, it has become evident that the throughput achieved depends upon how many output storage means can be populated with how many objects.

BRIEF SUMMARY OF THE INVENTION

The invention is accordingly based on the task of providing a device of the kind mentioned above, in which it is possible more effectively to improve the throughput.

According to the invention the task is solved in that a further sorting end point is arranged in the second transfer region.

The inventive solution has the advantage that the objects in the output conveyor device do not necessarily have to be provided in a single sorting order. Rather, the objects can now be provided in two partial sort orders, resulting in greater flexibility in the population of the output storage means. It is thereby possible, for each output storage means of the output conveyor device, to select from n partial orders that one with which the output storage means can be populated with the greatest number of objects.

There is the further advantage that the objects are distributed over a multiplicity of sorting end points, which is favorable in particular in the package field. In the case of packages, a multiplicity of packages can be arranged next to each other on the output storage means.

The input and/or output conveyor devices with the input and output storage means can for example be embodied as continuous conveyor means, such as chains or similar, fixed pockets or tablets. Alternatively, however, they can also be embodied as autonomous vehicles or as "power and free" conveyors.

The invention can be further developed by means of other advantageous embodiments, which are independent of each other.

The device can thus comprise a control device, which is embodied for control of the transfer of the objects from the input conveyor device into the output conveyor device and from the output conveyor device into the sorting end points and controls the transfer in such a way that the objects are output to the sorting end points in a multiplicity of partial orders. This has the advantage that the control device can divide the entirety of the objects across a multiplicity of partial orders and can thereby make particularly good use of the output storage means of the output conveyor device.

Furthermore, the input conveyor devices and the output conveyor devices in the first transfer region can be arranged in such a way that the input storage means are positioned in a vertical direction above the output storage means. This has the advantage that the objects can be transferred ballistically by means of gravity and that thereby no addition is necessary. The input storage means can for example comprise flaps, which release openings in the storage means, through which the object can fall into the output storage means.

In order likewise to be able to transfer the objects to the sorting end points ballistically, by means of gravity, the output conveyor devices and the sorting end points can be arranged in the second transfer region in such a way that the output storage means are positioned in a vertical direction above the sorting end points. Further possibilities for transfer are described in EP 1 863 600 B1.

In one advantageous development of the inventive device, the input conveyor device and the output conveyor device can be arranged relative to each other in the first transfer region in such a way that the input conveying direction runs counter to the output conveying direction. The input conveying speed can here be greater than the output conveying speed. Different lengths of conveying line of the output conveyor device and the input conveyor device can be compensated for by means of different conveying speeds.

In order to guarantee simple and secure transfer of objects to the sorting end points, the output storage means can in each case have a transport position and a dispensing position, wherein the output storage means are in each case embodied in the dispensing position for dispensing of the objects to one of the sorting end points. The sorting end points can for example be arranged underneath the output storage means and be transferred ballistically by means of an opening flap.

The invention is described below with reference to the appended figures. The features of the different embodiments of the invention can here be freely combined with each other, in which:

DESCRIPTION OF THE INVENTION

Figure 3:
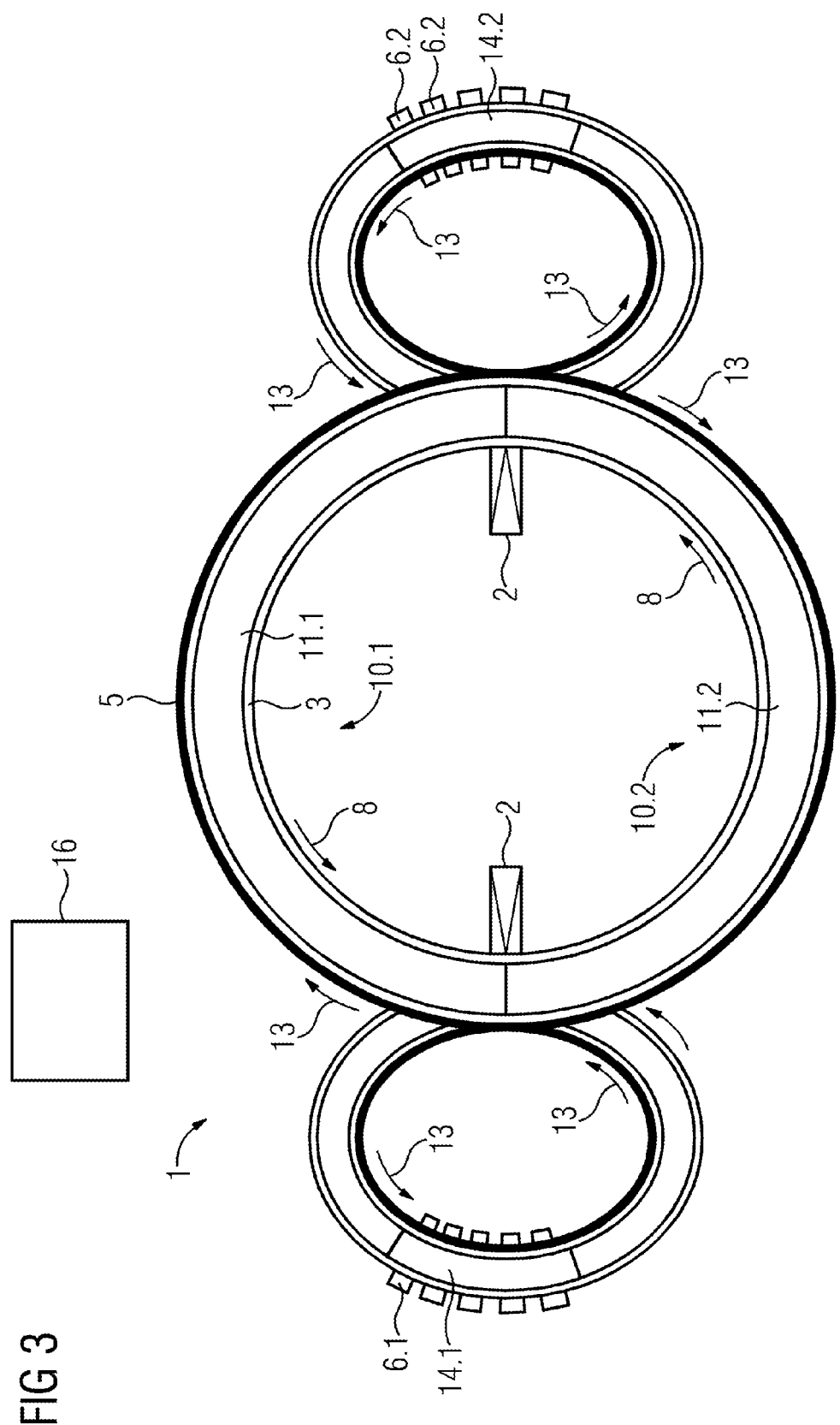
FIG. 3 shows a schematic representation of a further embodiment of the inventive sorting device, seen from above.
Figure 4:
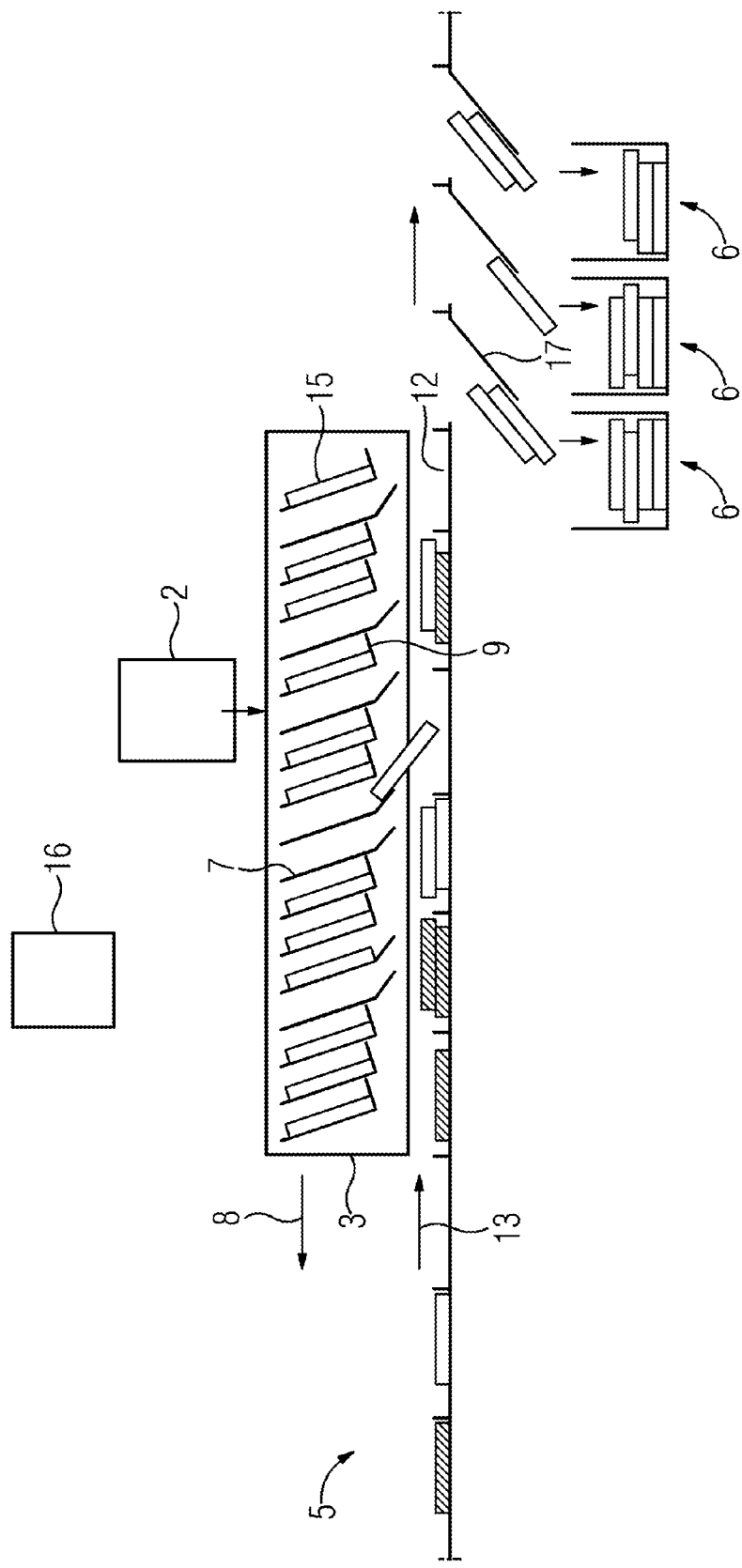
FIG. 4 shows a schematic side view of part of the sorting devices from FIGS. 1 through 3 in a side view.

For better representation, in FIGS. 3 and 4 the input and output conveyor devices are arranged adjacent to each other, with a horizontal transfer direction between the two.

Figure 1:
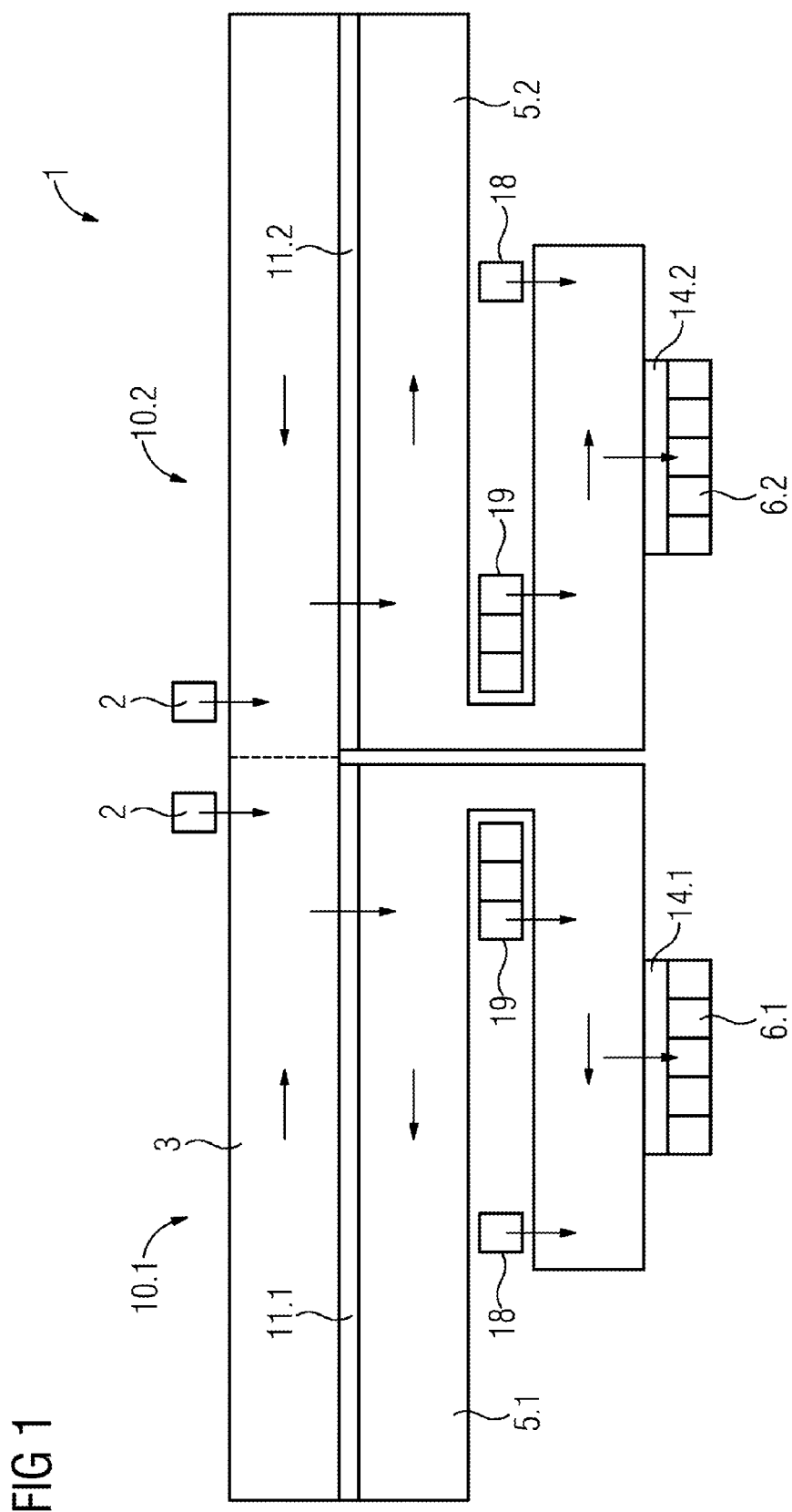
FIG. 1 shows a schematic representation of a first embodiment of the inventive sorting device in a side view.
Figure 2:
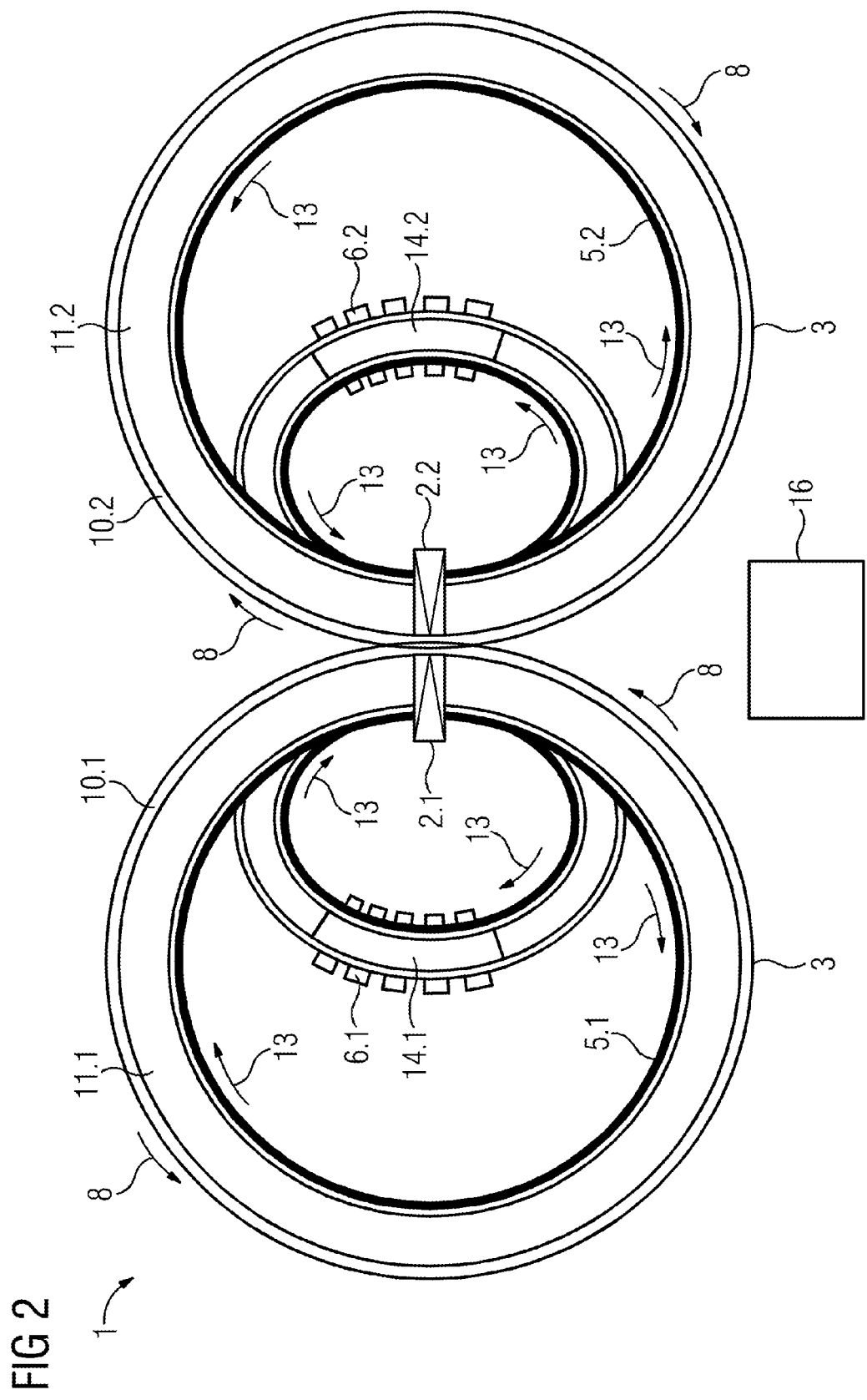
FIG. 2 shows a schematic representation of the embodiment in FIG. 1, seen from above.

There follows a description of the invention based on the exemplary embodiment of the inventive sorting device in FIGS. 1 and 2.

The inventive sorting device 1 comprises two loading stations 2, an input conveyor device 3, two output conveyor devices 5, a multiplicity of sorting end points 6 and a control device 16.

The input conveyor device 3 comprises a multiplicity of input storage means 7 (FIG. 4), which are arranged consecutively in an input conveying direction 8 and can be moved jointly in the input conveying direction 8 by means of a drive (not shown). The embodiment of the input conveyor device 3 and the input storage means 7 is already described in EP 1 863 600 B1, to which reference is made and whose content is to its full extent part of this application.

As shown in FIG. 2, the input conveyor device 3 seen from above, runs in figure-of-eight form, albeit without crossing, because of the over-and-under configuration. The input storage means 7 are here embodied as pockets arranged crosswise relative to the input conveyor direction 8 and fixedly connected to a continuous conveyor means, such as for example a chain. Consequently during operation the input storage means 7 are moved by the continuous conveying means along the figure-of-eight conveying line.

As shown in FIG. 4, the input storage means 7 each have a floor 9, which by means of a mechanism which is not shown, can be moved from a closed position to a position which is open in a downward direction. The loading stations 2 are in each case arranged in different conveying sections 10. The first conveying section 10.1 comprises one half of the conveying line of the input conveyor device 3, while the second conveying section 10.2 comprises the second half. The loading stations 2 are arranged in the conveying sections 10 in such a way that the whole conveying line of the input conveyor device 3 is thereby divided into two halves.

Upstream of the loading stations 2 from the transport perspective a separating device, a read device and possibly a buffer storage device, which are all known from the prior art and are thus not shown here, are in each case provided in the sorting device 1.

The output conveyor devices 5 are in each case assigned to one of the conveying sections 10 of the input conveyor device 3. The output conveyor devices 5 in each case have a multiplicity of output storage means 12, which are arranged consecutively in an output conveying direction 13. The output storage means 12 are moved along the conveying line of the output conveyor device 5 by means of a drive (not shown). The output storage means 12 are embodied as tablets in the embodiment from FIGS. 1 through 4, as already described in EP 1 863 360 B1. By means of a continuous conveyor means, such as for example a chain, the output storage means 12 are moved in the output conveying direction 13.

The output conveyor devices 5.1, 5.2 are in each case arranged in a first transfer region 11.1, 11.2 underneath the input conveyor device 3. In particular, the input storage means 7 run above the output storage means 12 in this first transfer region 11.1, 11.2. In the exemplary embodiment from FIGS. 1 and 2 the conveying line of the first output conveyor device 5.1 runs according to a figure of eight folded over itself in the middle, by means of which are embodied two circles, arranged one above the other. The circles are of different sizes, wherein the small one runs into the large one. Part of the output conveyor device 5.1, 5.2 thereby runs in the first transfer region 11.1, 11.2 and the other part runs in a second transfer region 14.1, 14.2. The path of an output storage means 12 on the first output conveyor device 5.1 thus runs, for example starting from the loading station 2.1, in the output conveying direction 13, initially in the first transfer region 11.1 and subsequently in the second transfer region 14.1 and then once again in the first transfer region 11.1, and so on. In the case of the embodiments in FIGS. 1 through 3, the first transfer region 11.1, 11.2 and the second transfer region 14.1, 14.2 are provided with a gap to each other. Alternatively, however, they can also abut each other, if no pre- and post-population post-population points 18, 19 are provided, which is to be described in greater detail below.

The sorting end points 6 are in each case arranged in the second transfer regions 14 of the output conveyor devices 5, wherein a multiplicity of sorting end points 6 are arranged in each second transfer region 14. The sorting end points 6 are here in each case arranged in a fixed position one after the other in the output conveying direction 13. In the exemplary embodiment from FIGS. 1 and 2 the sorting end points 6 are in each case arranged underneath the output storage means 12 of the output conveyor device 5. As shown by way of example in FIG. 4, the output storage means in each case comprise a floor 15, which can be brought from a transport position into a dispensing position. In the transport position the floor 15 is closed, and in the dispensing position it is open in the downward direction. Other embodiments of the output storage means 12 are of course possible.

There follows a description of the function of the inventive sorting device 1. Objects to be sorted 15, for example large format letters, packages or items of baggage, can be transferred from the loading stations 2 into the input storage means 7. In the embodiment shown in FIG. 4, the objects 15 are large-format letters, which have been positioned almost upright in the pocket-shaped input storage means 7.

The control device 16 comprises for example an SPS controller, and controls the movements and functionalities of the inventive sorting device 1.

An object 15 loaded from the loading station 2 into an input storage means 7 is moved from the input conveyor device 3 in the input conveying direction 8 into the first transfer region 11.1, 11.2. Viewed from the loading station 2.1 the object 15 is moved in the first conveying section 10.1.

The input conveying direction 8 and the output conveying direction 13 run counter to each other in the first transfer region 11. Furthermore, the input conveying speed of the input conveyor device 3 can be greater than the output conveying speed of the output conveyor device 5. On its path through the first transfer region 11.1, an output storage means 12 passes each input storage means 7 of the entire input conveyor device 3. During operation of the inventive sorting device 1, all objects 15 to be sorted are known to the control device 16. The device 1 is for example designed for single-pass sorting in collator mode after pre-sorting according to the tree-sort method.

As soon as all objects 15 of the pre-sorted part consignment from both loading stations 2 are in each case stored in an input storage means 7, the control device 16 assigns each object 15 a particular output storage means 12. On its way through the first transfer region 11.1 or 11.2 the assigned output storage means 12 sees or passes all input storage means 7 of the input conveyor device 3, and thus also that one in which the assigned object 15 is located. At a correct position predetermined by the control device 16, the control device 16 opens the floor 9 of the input storage means 7. The object 15 falls downwards through the open floor 9, under gravity, in the direction of the output conveyor device 5 and lands in the assigned output storage means 12. In order to optimize the transfer of the objects from the input storage means 7 into the output storage means 12, a fixed transfer device (not shown), which is known per se, can be provided in the transfer region 11, arranged in an interposed fashion.

The object 15 to be transferred to the output storage means 12 is transported by the output conveyor device 5 in the output conveying direction 13 from the first transfer region 11 into the second transfer region 14. As shown in FIG. 4, a multiplicity of objects 15 can also be conveyed in the output storage means 12 of the output conveyor device 5. When sorting large-format letters, as shown in FIG. 4, these are for example stacked upon one another.

The control device 16 determines one of the sorting end points 6 for each object 15. At the correct predetermined position in the second transfer region 14, the control device 16 opens the floor 17 of the corresponding output storage means 12. The object or objects 15 from the output storage means 12 falls or fall downwards through the open floor 17, under gravity, into the assigned sorting end point 6. Here too, additional transfer devices (not shown) can be provided. In the exemplary embodiment in FIG. 4, the sorting end points 6 are shown as stackers for large-format letters. Alternatively the sorting end points can also for example be conveyor belts, by means of which packages or items of baggage can be transported away.

The sorting device 1 further comprises pre-population points 18 and post-population points 19, which are arranged in areas between the first transfer region 11 and the second transfer region 14. At the pre-population points 18, unaddressed consignments or similar can advantageously be conveyed to the output storage means 12 and at the post-population points 19 addressed consignments can advantageously be conveyed to the output storage means 12, with the pre-population points 18 before, or with the post-population points 19, after the objects 15 are loaded into the output storage means 12. Pre- and post-population points 18, 19 of this kind are known from the prior art and are described in EP 1 863 600 B1.

The sorting task to be solved is simplified by the arrangement of a multiplicity of sorting end points 6 in each output conveyor device 5. The control device 16 can thus sort the objects 15 with an increased throughput, because only a partial order of the entire sorting order of the objects 15 needs to be maintained in each sorting end point 6. Each object 15 which is transferred to an output storage means 12, is always transferred to one of the sorting end points 6. It is not provided for objects 15 to remain in the output storage means 12. Thus the correct sequence of objects must be generated as early as upon transfer in the first transfer region 1. By means of the inventive multiplicity of sorting end points 6 and the possibility of a multiplicity of partial sequences or partial orders, this is possible with a greater throughput, as more output storage means can be populated with more objects.

There follows a description of a further exemplary embodiment of the inventive sorting device 1 with reference to FIG. 3. For the sake of brevity, only the differences from the embodiment in FIGS. 1 and 2 are described. Features which are not described anew are identical to the embodiment in FIGS. 1 and 2.

The sorting device 1 in the embodiment from FIG. 3 has an input conveyor device 3 which runs in a circular course. In contrast to the embodiment in FIGS. 1 and 2, the sorting device 1 from FIG. 3 comprises only one output conveyor device 5. However the output conveyor device 5 of the embodiment in FIG. 3 runs following a one-and-a-half-fold figure-of-eight course with a total of three circular segments. At the transitions between the circular segments the output conveyor device 5 here runs without crossings, because of the over-and-under configuration. In the central circular segment are located two first transfer regions 11.1, 11.2. The second transfer regions 14.1, 14.2. are in case located in the outer, smaller circular segments. Apart from the routing, the embodiments of the sorting device 1 are the same as those in FIGS. 1 and 2.

The invention claimed is:

1. A sorting device for sorting objects, the sorting device comprising:
   an input conveyor device having a multiplicity of input storage devices movably disposed in an input conveying direction;
   a loading station configured for loading said input storage devices with an object in each case;
   an output conveyor device having a multiplicity of output storage devices movably disposed in an output conveying direction;
   a sorting end point for accommodating objects;
   a first transfer region, in which said input conveyor devices and said output conveyor devices are arranged to enable objects to be transferred from said input storage devices into said output storage devices;
   a second transfer region, separate from the first transfer region, in which said output conveyor device and said sorting end point are arranged to enable objects to be transferred from said output storage devices to said sorting end point;
   a further sorting end point disposed in said second transfer region; and
   a control device for controlling a transfer of the objects from said input conveyor devices to said output conveyor devices and from said output conveyor devices to said sorting end points, said control device being configured to control the transfer of the objects to said output storage devices of said output conveyor device to cause the objects to be output to said sorting end point and to said further sorting end point in a plurality of mutually different partial sequences.

2. The device according to claim 1, wherein each of said output storage devices is configured for storing a plurality of objects in a partial sorting sequence.

3. The device according to claim 1, wherein said input conveyor device and said output conveyor device in said first transfer region are arranged relative to one another with said input storage devices positioned vertically above said output storage devices or adjacent thereto.

4. The device according to claim 1, wherein said output conveyor device and said sorting end points in said second transfer region are arranged relative to one another with said output storage devices positioned vertically above said sorting end points or adjacent thereto.

5. The device according to claim 1, wherein said input conveyor device and said output conveyor device are arranged relative to one another in said first transfer region to define the input conveying direction to run counter to the output conveying direction.

6. The device according to claim 1, wherein each of said output storage devices is configured to selectively assume a transport position and a dispensing position, and wherein, in the dispensing position, said output storage device is arranged for dispensing objects to one of said sorting end points.

* * * * *